United States Patent
Sayyah

(10) Patent No.: US 7,603,037 B2
(45) Date of Patent: Oct. 13, 2009

(54) ULTRA-DENSE WAVELENGTH AND SUBCARRIER MULTIPLEXED OPTICAL AND RF/MM-WAVE TRANSMISSION SYSTEM

(75) Inventor: Keyvan Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 834 days.

(21) Appl. No.: 10/773,945

(22) Filed: Feb. 6, 2004

(65) Prior Publication Data

US 2004/0258420 A1 Dec. 23, 2004

Related U.S. Application Data

(60) Provisional application No. 60/480,344, filed on Jun. 20, 2003.

(51) Int. Cl.
*H04J 14/02* (2006.01)
(52) U.S. Cl. .......................... 398/91; 398/183; 398/207
(58) Field of Classification Search ................. 398/115, 398/116, 91
See application file for complete search history.

(56) References Cited

U.S. PATENT DOCUMENTS

| | | | |
|---|---|---|---|
| 6,487,329 B2 * | 11/2002 | Foltzer | 385/15 |
| 6,545,785 B1 * | 4/2003 | Heflinger et al. | 398/201 |
| 6,965,739 B2 * | 11/2005 | Seto et al. | 398/183 |
| 6,980,353 B2 * | 12/2005 | Watson et al. | 359/326 |
| 7,139,545 B2 * | 11/2006 | Drentea | 455/314 |
| 2002/0075539 A1 * | 6/2002 | Iida et al. | 359/124 |
| 2005/0018724 A1 * | 1/2005 | Da Silva et al. | 372/32 |

OTHER PUBLICATIONS

Lim, Christina, et al., "Wavelength-Interleaving Technique to Improve Optical Spectral Efficiency in Millimeter-Wave WDM Fiber-Radio," paper presented at the LEOS 2001 Conference, pp. 54-55 (2001).

* cited by examiner

*Primary Examiner*—Dzung D Tran
(74) *Attorney, Agent, or Firm*—Ladas & Parry

(57) ABSTRACT

Disclosed is a method and apparatus for optically modulating and transmitting source data. An optical comb comprising optical tones having a frequency spacing equal to $\Delta f$ is generated by an optical comb generator. Selected ones of the optical tones in the optical comb are modulated according to the source data to produce a comb of modulated optical tones. At least one optical tone in the optical comb is frequency shifted by a frequency less than $\Delta f$ to produce a frequency shifted unmodulated optical reference tone. The optical comb, the frequency shifted unmodulated optical reference tone and the comb of modulated tones are multiplexed onto at least one optical path.

29 Claims, 3 Drawing Sheets

ULTRA-DENSE WAVELENGTH AND SUBCARRIER MULTIPLEXED OPTICAL AND RF/MM-WAVE TRANSMISSION SYSTEM

CROSS REFERENCE TO RELATED APPLICATIONS

This application claims the benefit of U.S. Provisional Patent Application No. 60/480,344 filed Jun. 20, 2003, the disclosure of which is hereby incorporated herein by reference.

TECHNICAL FIELD

This invention relates to a novel optical transmission system and method preferably utilizing ultra-dense wavelength division multiplexing (WDM) and pseudo-subcarrier multiplexing (SCM) techniques with dual purposes of (1) increasing the spectral usage efficiently of optical networks and (2) generating dynamic and agile data-modulated RF/mm-wave wireless carriers.

BACKGROUND OF THE INVENTION

The prior art in the area of improving the spectral efficiency of optical transmission systems includes a paper entitled "Wavelength-Interleaving Technique to Improve Optical Spectral Efficiency in Millimeter-wave WDM Fiber-Radio" by C. Lim et al. presented at the LEOS 2001 conference. In this paper, the authors describe a wavelength interleaving technique for more effective use of the optical spectrum in which different laser lines are data-modulated using external single sideband (SSB) optical modulators. The modulated laser lines are then combined using a wavelength-interleaved multiplexer before transmission in an optical network. This technique improves the spectral efficiency of standard WDM optical networks, which have channel spacings of 50 or 100 GHz. However, it is still limited, due to the channel resolution of the wavelength-interleaved multiplexer and the fiber Bragg grating (FBG) serving as the demultiplexer, to a channel spacing of 10 GHz or more. The optical channel spacing demonstrated in this paper was 25 GHz.

As is described herein, the channel spacing is determined by the tone spacing in the optical comb generator and the data bandwidth required for each channel. The OCG tone spacing is controllable and can be as narrow as a few hundred MHz. Assuming the bandwidth of the data in the various channels to be limited to a few hundred MHz with a channel spacing of 1 GHz, more than 3000 independent channels can be realized in the 30 nm optical window of, for example, an Erbium-doped fiber amplifier (EDFA) used in a communication link between the transmitter portion and the receiver portion. This is a factor of 10 higher than the number of channels achievable using an optimistically assumed channel spacing of 10 GHz for the approach mentioned in the paper by C. Lim referred to above. Furthermore, the effective number of channels in the present approach can be further increased by using single sideband optical modulators instead of the standard double sideband modulation assumed thus far.

Another advantage of the approach described herein over conventional subcarrier multiplexed optical transmission systems is that no RF or mm-wave generator is required for the various channels. In conventional SCM optical systems, each optical channel is modulated by an RF or mm-wave subcarrier on top of which the modulated data is carried. One of the reasons for using the SCM technique in conjunction with WDM systems is to improve the optical spectral efficiency. For a large number of channels, a large number of RF or mm-wave generators are required. This renders such systems quite complex, cumbersome and costly, in particular for mm-wave subcarrier generation. One of the advantages of the present approach, other than its extremely effective use of the optical spectrum, is that no RF or mm-wave generators are required for each channel. For a fiber radio implementation of this system, in which the transmitted data channels are converted from optical carriers to RF or mm-wave carrier in base stations or other receiver sites, these wireless carriers are generated automatically as described in greater detail below. Hence, the system disclosed herein is referred to as an ultra-wideband WDM and/or pseudo-SCM optical system.

BRIEF DESCRIPTIONS OF THE INVENTION

Briefly, and in one aspect or embodiment, this invention includes, in a transmitter portion, an array of lasers, which are preferably implemented as laser diodes, each optically injection locked to a spectral line of an optical comb generator (OCG). The optical output of each of these lasers is modulated, either directly or through an external optical modulator, with a specific set of data to be transmitted. The wavelength of one laser, which is not modulated and is used as a reference, is shifted by an amount less than the spectral separation of the optical comb lines. This wavelength shift prevents the potential mixing and interference between the various data sets after photodetection at the receiver. The invention also preferably includes a receiver portion that comprises an array of parallel RF/mm-wave filters each switched with a RF switch (preferably a RF microelectromechanical switch (MEMS)) to select the appropriate data channel. The original comb lines used for locking the lasers are also transported to the receiver and mixed with the wavelength-shifted reference line to result in unmodulated RF/mm-wave wireless carriers. These carriers, after being selected by the appropriate switched filter, can be used to downconvert the corresponding RF/mm-wave-carried data sets.

In another aspect or embodiment, the invention provides (i) optically phase locked and data-modulated laser lines and the wavelength-shifted reference line together with the RF-switched filter bank that cooperate to result in an optical transmission system with an extremely efficient use of the optical spectrum, as well as (ii) a novel technique for generating data-modulated RF/mm-wave wireless carriers that can be dynamically switched among a large number of radio frequencies for efficient use of the radio spectrum.

In accordance with yet another aspect or embodiment of the present invention, in a transmitter, an optical comb comprising optical tones having a frequency spacing equal to $\Delta f$ is generated by an optical comb generator. Selected ones of the optical tones in the optical comb are modulated according to the source data to produce a comb of modulated optical tones using the injection-locked slave lasers. At least one optical tone in the optical comb is frequency shifted by a frequency less than $\Delta f$ to produce a frequency shifted unmodulated optical reference tone. The optical comb, the frequency shifted unmodulated optical reference tones and the comb of modulated tones are multiplexed onto at least two optical paths.

In accordance with still another aspect or embodiment of the invention, in a receiver, the tones that are multiplexed onto at least one optical path are received and detected. The tones are optically demultiplexed in at least one demultiplexer to recover the multiplexed optical comb, frequency shifted unmodulated optical reference tone and comb of modulated tones. A first photodetector detects the modulated tones provided via the at least one demultiplexer. A second photodetector detects the unmodulated tones provided via the at least one demultiplexer; and then the outputs of the first and second photodetectors are filtered and mixed in order to recover the source data.

The present invention, in still another aspect or embodiment, relates to a method of optically modulating and transmitting source data comprising: (a) generating an optical comb comprising optical tones having a frequency spacing equal to $\Delta f$; (b) modulating selected ones of the optical tones in the optical comb according to the source data to produce a comb of modulated optical tones; (c) frequency shifting at least one optical tone in the optical comb by a frequency less than $\Delta f$ to produce a frequency shifted unmodulated optical reference tone; and (d) multiplexing the optical comb, the frequency shifted unmodulated optical reference tone and the comb of modulated tones onto at least one optical path for transmission.

Optionally, the method of optically modulating and transmitting source data may be used with a method of receiving and demodulating source data, the method of receiving comprising: (a) optically demultiplexing the multiplexed optical comb, the frequency shifted unmodulated optical reference tone and the comb of modulated tones in at least one demultiplexer; (b) photodetecting in a first photodetector modulated tones provided via the at least one demultiplexer; (c) photodetecting in a second photodetector unmodulated tones provided via the at least one demultiplexer; and (d) filtering and mixing outputs of the first and second photodetectors.

DETAILED DESCRIPTION

Figure 1:
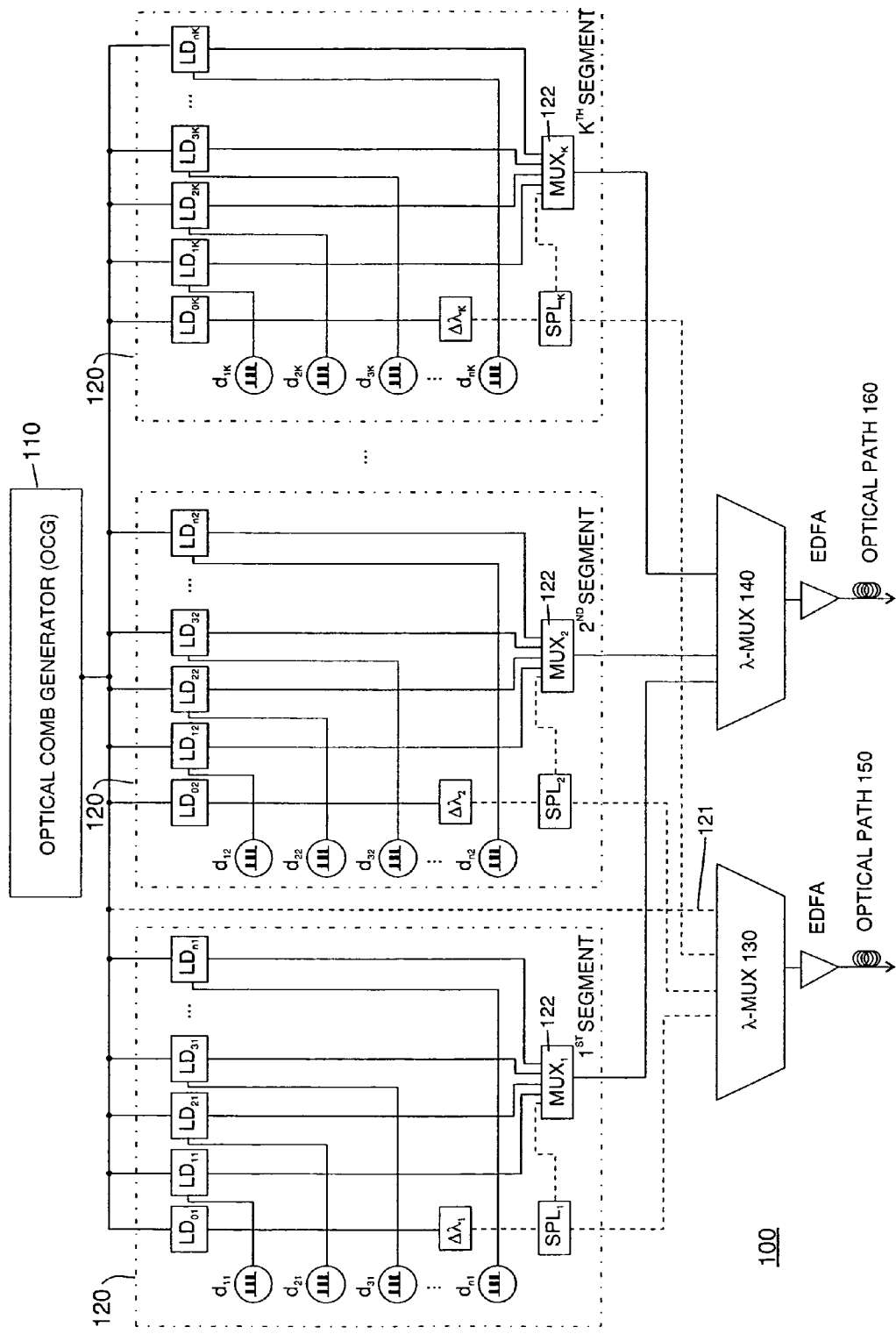
FIG. 1 is a schematic diagram of a transmitter portion of an ultra-wideband WDM/Pseudo—SCM Optical Communication System.
Figure 2:
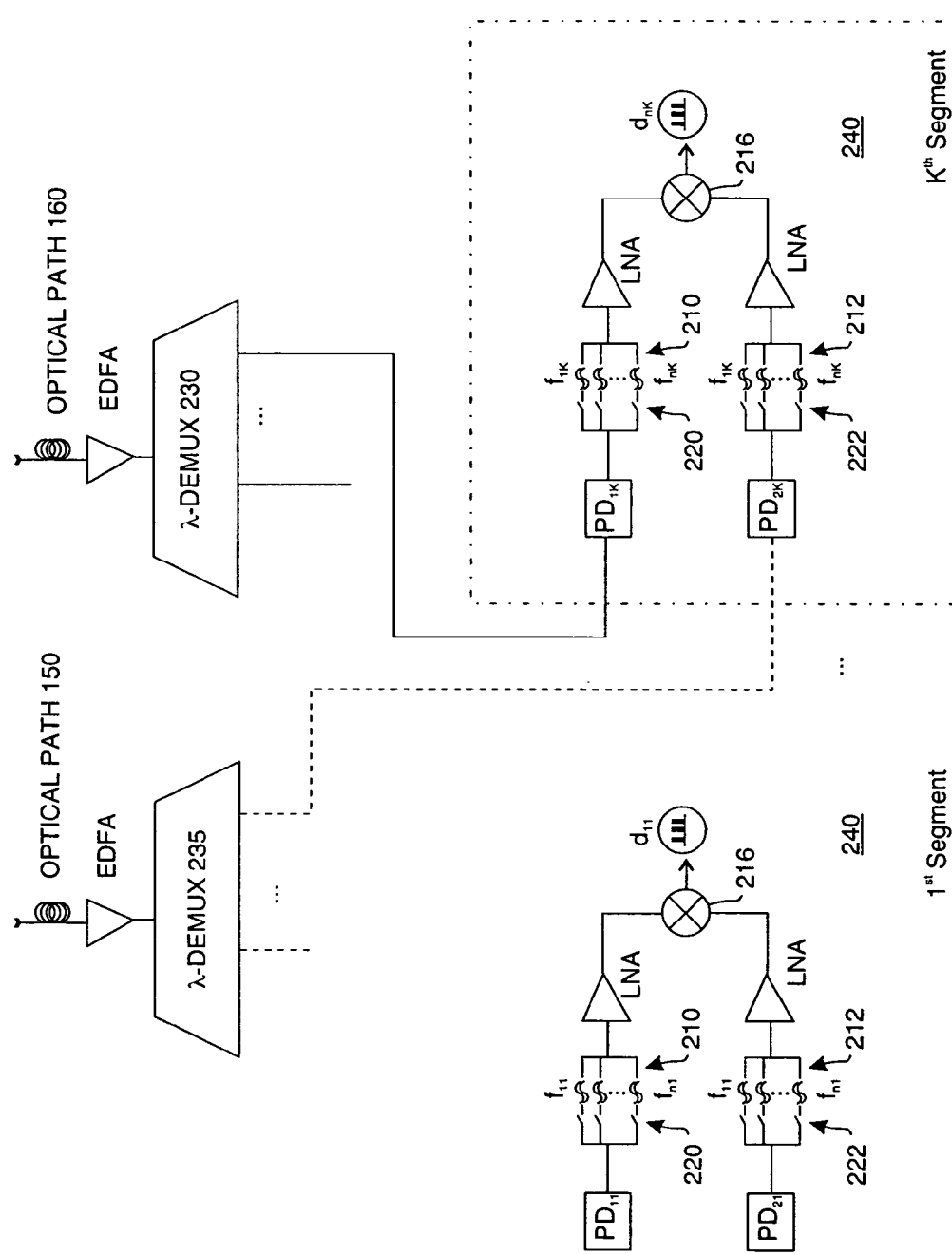
FIG. 2 is a schematic diagram of a receiver portion of an ultra wideband WDM/Pseudo—SCM Optical Communication System.

A schematic diagram of the optical transmission system of the present invention is shown in FIGS. 1 and 2. It consists of two main portions: an optical portion 100 and an optoelectronic receiver portion 200. The optical transmitter portion 100 is comprised of an optical comb generator (OCG) 110, an array of laser diodes $LD_{01}$... $LD_{NK}$ and optical wavelength shifters $\Delta\lambda_1$... $\Delta\lambda_K$. The main components of the optoelectronic portion 200 are photodetectors $PD_{11}$... $PD_{2K}$, at least one RF/mm-wave filter bank 210, and a number of RF switches 220 for each filter bank 210. Switches 200 are preferably implemented using MEM switches. The OCG 110 provides a large number of phase locked optical tones with equal tone spacing. The tone spacing of the OCG 110 determines the narrowest channel spacing possible with the disclosed system. An array of lasers $LD_{01}$-$LD_{n1}$; $LD_{02}$-$LD_{n2}$; $LD_{0K}$-$LD_{nK}$ are provided, which are grouped in k segments 120 with n lasers per segment. Each laser LD is optically injection locked to a different spectral line of the optical comb generator 110 and thereby generates the different optical channels. The lasers LD are preferably provided by laser diode devices. The optical output of each of these lasers (excepting the one laser in each segment 120 that is left unmodulated—see lasers $LD_{01}$, $LD_{02}$... $LD_{0K}$) is modulated, either directly (as shown in FIG. 1) or through an external optical modulator, with corresponding data inputs $d_{11}$-$d_{n1}$; $d_{12}$-$d_{n2}$... $d_{iK}$-$d_{nK}$, which provide the data to be transmitted by the disclosed system. This data can be digital or analog information including audio, video or various other forms of data. The modulation is preferably intensity modulation (square of amplitude), but other types of modulation can be used as desired and appropriate. One of the advantages of this scheme is that any data modulation format can be applied to the optical channels. This allows the use of higher order modulation formats for more efficient utilization of the available optical spectrum.

The optical channels are divided into k segments 120 for easier access during add/drop operations at the receiving end 200 using standard WDM multiplexers (MUX) and demultiplexers (DEMUX). Each segment 120 has n lasers LD and n associated data sources d. The subscripts used with the lasers LD and data sources d in this description have the following meanings: the first number denotes the number of the laser or data source in a particular segment and the second number denotes the segment number. The unmodulated lasers are given the number 0, so there are no corresponding data sources having a subscript which begins with a zero while the data sources and associated modulated lasers have a number greater than zero according to the number scheme used by FIG. 1. The outputs of the lasers are applied to a multiplexer MUX 122 (also identified as $MUX_1$, $MUX_2$... $MUX_K$) associated with each segment. As indicated above, the modulated lasers can be modulated directly or a downstream modulator can be used instead to modulate unmodulated outputs of lasers $LD_1$-$LD_{n1}$; $LD_{12}$-$LD_{2n}$;... $LD_{1K}$-$LD_{nK}$ to thereby produce the equivalent of a modulated laser. In either case, the modulated outputs are applied with the output of the unmodulated and frequency-shifted laser ($LD_{01}$, for example) to the MUX 122 associated with segment 120. The outputs of the multiplexers $MUX_1$, $MUX_2$... $MUX_K$ in each segment are applied to yet another multiplexer 140. The outputs of the unmodulated and frequency-shifted lasers $LD_{01}$, $LD_{02}$, $LD_{0K}$ are applied to yet another multiplexer 130. Since the outputs of the unmodulated and frequency-shifted lasers $LD_{01}$, $LD_{02}$,... $LD_{0K}$ are applied to both MUX 130 and the MUX 122 associated with each segment 120, a splitter SPL may be conveniently used.

If it is assumed, for example, that the tone spacing of the OCG 110 is 1 GHz and that it has an optical bandwidth of 1 THz, this results in about 1000 potential optical channels. State-of-the-art WDM MUX/DEMUXes have channel spacings of 20-50 GHz. Thus, the potential 1000 channels can be divided into segments 120 of, for example, fifty channels each (so n=50 in this example), with the n channels in each segment occupying an individual channel of the MUX/DEMUX. Thus, MUX/DEMUXes 130, 140 with a total of 20 channels (k=20 in this example) could accommodate the 1000 optical channels generated using the approach described herein.

With each of the above-mentioned k segments 120 comprising, for example 50 optical channels, there is provided one injection-locked laser ($LD_{01}$, $LD_{02}$,... $LD_{0K}$), that is used to generate an unmodulated reference optical channel. The wavelength of this unmodulated laser is shifted by an amount less than (for example half of) the tone spacing of the OCG 110 by a shifter $\Delta\lambda_1$, $\Delta\lambda_2$... $\Delta\lambda_K$ associated with each unmodulated laser $LD_{01}$, $LD_{02}$... $LD_{0K}$. This wavelength shifting is done in order to prevent mixing and interference between the various data sets after photodetection in the receiver portion 200. This is an important feature which will become even clearer through the example given below.

After multiplexing all the data-modulated optical channels in multiplexer 140, those channels are transmitted through an optical path 160, which may be part of a standard optical network. Similarly, after multiplexing all the unmodulated optical channels in multiplexer 130, those channels are transmitted through an optical path 150 which may also be part of a standard optical network. The standard optical network may include optic fiber and/or free space optical paths.

Figure 3:
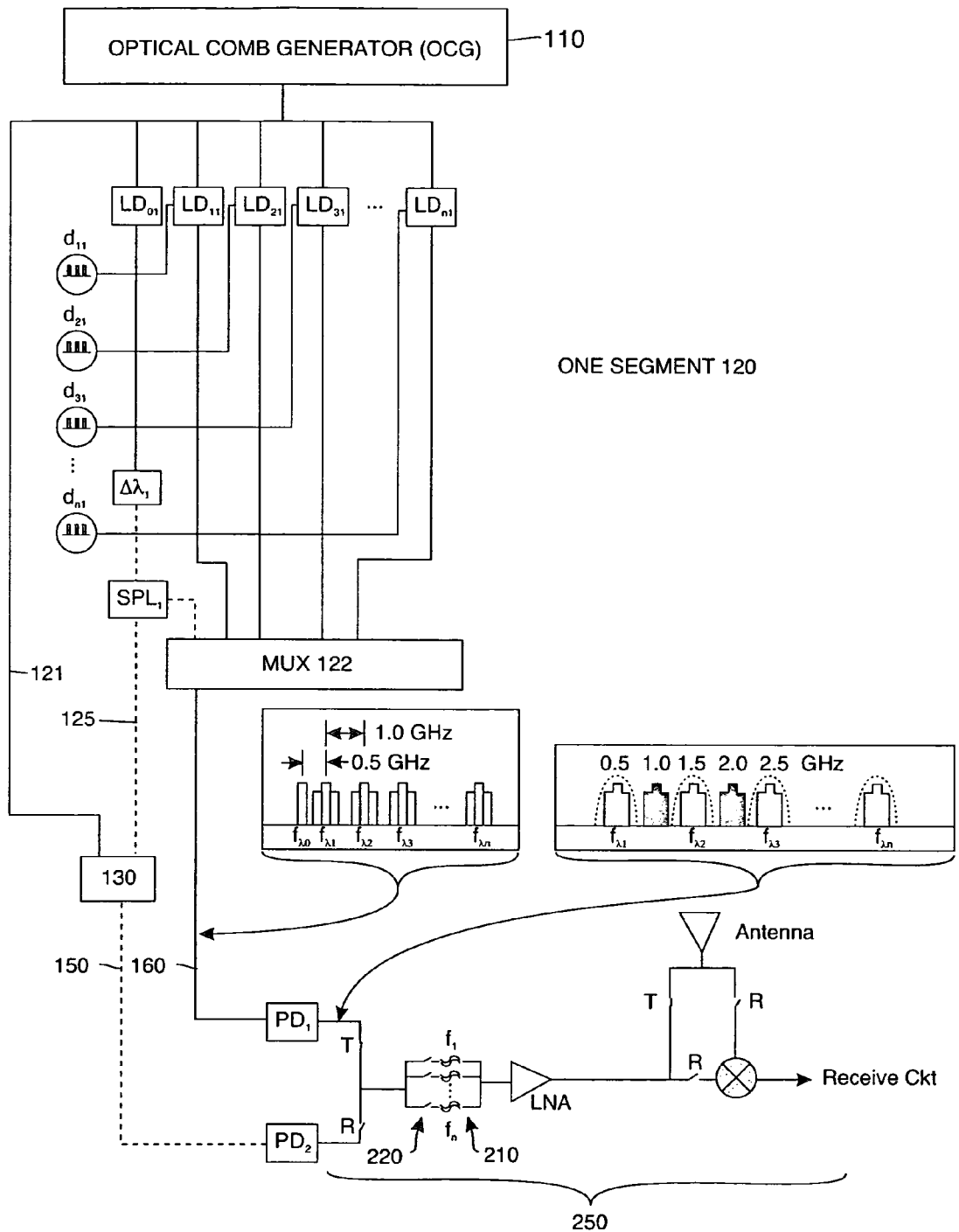
FIG. 3 is a schematic diagram of the agile-frequency optoelectronic portions of the transmitter and the receiver.

In the receiver portion 200, which includes k drops or receive sites or simply segments 240, the optical channels on path 160, which carries the desired optical (modulated) channel(s), is demultiplexed by a demultiplexer 230, while the associated unmodulated channel on path 150 is demultiplexed by a demultiplexer 235. For example, if the segment 240 identified as the 1 st segment corresponds to the 1 st segment 120 in the transmitter portion, then the signals received by the 1st segment 240 correspond to the outputs of $MUX_1$ and $SPL_1$. The data-modulated optical channels from $MUX_1$ and the reference optical channel from $SPL_1$ via $MUX_1$ in this group are all combined in a first high bandwidth (mm-wave) photodetector ($PD_{11}$ ... $PD_{1K}$) while the unmodulated signals directly from $SPL_1$ are applied to a second photodetector ($PD_{21}$ ... $PD_{2K}$). This results in the generation of a number of RF/mm-wave signals at the output of the first photodetector as a result of mutual beating (heterodyning) among all the optical channels present at the photodetector input. A schematic of the optical channels at the input of the photodetector and the RF/mm-wave channels at its output are shown in FIG. 3 (FIG. 3 will be explained in greater detail below—for the time being the reader should concentrate on the two frequency spectrums depicted immediately upstream and downstream of $PD_1$). The frequency of each RF/mm-wave channel is determined by the difference between the optical frequencies of the two phase-locked optical channels heterodyned to generate the radio waveform. The number of segments 240 in the receiver portion can be different than the number of segments 120 in the transmitter portion.

To better understand the effect of the wavelength shifting of the reference optical channel frequency shifters $\Delta\lambda_1$, $\Delta\lambda_2$ ... $\Delta\lambda_3$, it is helpful to consider an example. Let us assume that the optical comb generator 110 has a tone spacing of 1 GHz. If a reference laser diode, which is locked to an OCG tone, were not shifted in frequency, the beat RF/mm-wave frequency between this laser and the data-modulated lasers could be at the same frequency as one or more beat frequencies between the modulated lasers themselves. This would result in undesirable mixing and interference. However, if the optical frequency of the reference laser is shifted by, for example, 0.5 GHz in this example (which is one half of the tone spacing of OCG 110 in this example), then the desirable FR/mm-wave beat frequencies between the shifted reference laser and the data-modulated lasers will have values of 0.5, 1.5, 2.5, ... $n\Delta f - 0.5$ Ghz, where $\Delta f = 1$ GHz is the OCG 110 tone spacing and n is an integer. On the other hand, the undesirable beat frequencies generated due to the optical heterodyning between the data-modulated laser will have center frequencies of 1.0, 2.0, 3.0, ... $n\Delta f$ GHz. Thus, this wavelength shifting of the reference laser $LD_{01}$ by shifter $\Delta\lambda_1$ (and $LD_{02}$ by shifter $\Delta\lambda_2$, etc) results in the spectral separation of the desirable (shown as white) and undesirable (shown as dark) RF/mm-wave beat signals, as shown in FIG. 3, downstream of photodetector $PD_1$ (or downstream of $PD_{11}$ ... $PD_{1K}$ in the case of the embodiment of FIG. 2). The desired RF/mm-wave channel can then be selected by appropriate filtering by, for example, a switched filter array 210 (which may be switched by a group of MEMS 220). The filters of array 210 are preferably narrow bandpass filters designed to capture one of the desirable (light grey in FIG. 3) RF/mm-wave beat signals, which, after filtering is detected in a mixer 216.

Photodetectors $PD_{21}$. $PD_{2K}$ see unmodulated tones at 0.5 GHz (from $\Delta\lambda_1$, for example) plus the unmodulated tones of OCG 110 (which are passed via optical path 121 that is preferably implemented by an optic fiber). $PD_{21}$ generates its own mixing products (at 0.5 GHz, 1.0 GHz, 1.5 GHz, 2.0 GHz, 2.5 GHz, ... in this example). The appropriate unmodulated tone is selected by appropriate filtering by again, for example, a switched filter 212 (which may be switched by a group of MEMS 222 for switching narrow band filters as in the case of the filters of filter array 210) and then that tone is mixed in mixer 216 with the modulated RF channel selected by switched filter array 210 to recover the data element ($d_{11}$ in this particular example).

In this example, the tones at 1.5 GHz, 2.5 GHz, 3.5 GHz, ... are all desirable, since they are pure in terms of their source of modulation, while the tones at 1.0 GHz, 2.0 GHz, 3.0 GHz, have undesirable mixing products since one modulated tone can mix with one or more other modulated tone(s) in the photodetection process. Thus, the information at the tones at 1.0 GHz, 2.0 GHz, 3.0 GHz . . . are impure (in this example) in the sense that they contain information which has been scrambled by the mixing process. But by shifting the reference tones generated by the unmodulated lasers $LD_{01}$, $LD_{02}$ ... $LD_{0K}$ by an amount which places them between (and preferably halfway between) the tones generated by the OCG 110, the mixing products at the frequencies of of 0.5 $\Delta f$, 1.5 $\Delta f$, 2.5 $\Delta f$, ... $n\Delta f$, where $\Delta f$ is the tone spacing of the OCG 110, yields recoverable information at the desirable RF/mm-wave channels discussed in the foregoing example.

Another aspect of the present invention is the simultaneous generation of the same RF/mm-wave carriers without any data modulation. This has already been discussed above in some detail with reference to the frequency spectrum depicted in FIG. 3. These carriers are generated in the second photodetectors $PD_{21}$ ... $PD_{2K}$ (see FIG. 2) by optically heterodyning the original tones in the optical comb generator with the frequency shifted reference lasers, as shown in FIG. 2, and selecting them using the aforementioned similar MEMS 222 switched filter bank 212. These carriers can be used in the receive/drop mode of operation for downconverting the received signal down to baseband as signals $d_{11}$ ... $d_{nK}$ before processing in the receiver circuitry using electronic mixers 216, as shown in FIG. 2.

A variation of the proposed optical system can be used to dynamically select RF/mm-wave data-modulated signals(s) among a large number of potential radio channels. A schematic diagram of a frequency-agile optoelectronic RF/mm-wave transceiver based on the above concept is shown in FIG. 3. Also shown in the electronic portion 250 of FIG. 3 are a number of other switches (preferably implemented as MEM switches) whose function is to select the transmission (T) or receive (R) mode of operation of this disclosed frequency-agile optoelectronic FR/mm-wave transceiver (in FIG. 3 the transmit switches T are shown in a closed or transmitting position while the receive switches are shown as being open—to shift to a receive mode, the transmit switches T would be opened while the receive switches R would be closed).

The operation of this transceiver is very similar to the optical transmission system described above with reference to FIGS. 1 and 2, with some minor variations. The reference numerals are the same as used with respect to FIGS. 1 and 2 where the elements perform the same or a similar function.

For example, elements 122 and 130 could be provided by combiners or by multiplexers, both of which perform somewhat similar functions.

The device shown in FIG. 3 can be implemented on a single substrate and this is susceptible to mass manufacturing using photolithographic techniques. The main purpose of this device is to (i) select and transmit RF/mm-wave signals modulated with any arbitrary data modulation format among a large number of radio channels to improve the radio spectrum usage efficiency, as well as receive and detect any signal within these channels, and (ii) to select the most suitable frequency band available for transmission. This is accomplished by a rapid and sequential mixing of consecutively selected RF/mm-wave carriers generated in $PD_2$ with the receive signal through rapid switching of the filter 210 (preferably MEMS 220 are used to switch in and out individual bandpass filters). Once a baseband signal is detected by the receiver circuitry, the received frequency is determined. Alternatively, the received frequency can be pre-selected according to a known schedule or it can be frequency-hopped to produce a spread spectrum. The baseband detection technique can also be used to scan the radio spectrum and select the most suitable frequency band available for transmission. MEMS switches 220, T, R can have a response time of the order of a few microseconds. Thus, 100 RF/mm-wave channels can be scanned in a few tenths of millisecond time frames.

When in a transmitting mode of operation, switched filter 210 supplies the same modulated output as does switched filter 220 in the embodiment of FIG. 2. That modulated output is preferably supplied to the input of a low noise amplifier (LNA) in the cases of both embodiments, although in FIG. 3 the gain of the LNA is preferably sufficient to enable the output to be transmitted to a remotely located receiver (or transceiver) via an antenna. When operating in a receiving mode of operation, the switched filter 210 of FIG. 3 supplies the same unmodulated output as does switched filter 212 in the embodiment of FIG. 2 and as in the case of switched filter 212 of FIG. 2, the output is supplied to mixer 216 where the unmodulated output of the LNA is mixed with the modulated signal generated by a remote transmitter (or transceiver) and received via the antenna.

The receiver and transmitter need not share a common OCG 110 and thus the receiver and transmitter can be remotely located with respect to one another. The apparatus depicted by FIG. 3 is a transceiver and those skilled in the art can easily convert it to either a mere receiver or a mere transmitter, if so desired.

The frequency of the reference optical channel 125 can be shifted using standard acousto-optical or electro-optical modulators. High-speed photodetectors with bandwidths up to 60 GHz are commercially available, while bandwidths as high as 100 GHz have been experimentally demonstrated. RF/mm-wave filters in miniature planar form have been demonstrated using different technologies. For example, a mm-wave bandpass filter 210 with a center frequency of 50 GHz, a passband of 0.5 GHz and a 20-dB bandwidth of 2 GHz can be realized with a 4-pole Chebyshev filter design using overmoded metallic waveguide resonator filter technology. Such a filter would have a passband insertion loss of only 1 dB. Another embodiment of filter 210 having similar performance can be realized using the micromachined stripline resonator technology.

Having described this invention in connection with a number of embodiments, modification will now certainly suggest itself to those skilled in the art. As such, the invention is not to be limited to the disclosed embodiments except as required by the appended claims.

What is claimed is:

1. An optical data transmission system comprising:
   a. a data transmission portion including:
      (i) an optical comb generator for generating a comb of discrete optical tones;
      (ii) the data transmission portion being arranged in a plurality of segments, each segment of the data transmission portion including at least:
         (a) an array of lasers, with each laser in the array of lasers in each segment being injection locked to an optical tone in the comb generated by the optical comb generator;
         (b) a data source providing data for modulating the light generated by a majority but less than all of the lasers in the array of lasers in each segment; and
         (c) a frequency shifter for frequency shifting at least one laser in the array of lasers in each segment, the frequency shifter shifting cooperating with the at least one laser in the array of lasers in each segment to generate a frequency-shifted unmodulated reference signal which occurs in the frequency domain between the discrete optical tones generated by the optical comb generator; (iii) the data transmission portion also including multiplexers for combining outputs of the modulated lasers and the frequency-shifted unmodulated reference signal and the comb of discrete optical tones onto at least two optical paths;
   b. a data receiving portion including:
      (i) at least two demultiplexers for demultiplexing signals on the at least two optical paths;
      (ii) the data receiving portion being arranged in a plurality of segments, each segment of the data receiving portion including at least:
         (a) a photodetector for detecting demultiplexed modulated signals from at least one of the demultiplexers;
         (b) a photodetector for detecting demultiplexed unmodulated signals from at least another of the demultiplexers;
         (c) a filter array associated with each photodetector in each segment, the filter array selecting a desired modulated tone and an associated desired unmodulated tone between the discrete optical tones generated by the optical comb generator; and
         (d) a mixer for detecting the filtered demultiplexed modulated signals and the filtered demultiplexed unmodulated signals to recover at least a portion of the data provided by the data source.

2. The optical data transmission system of claim 1 wherein the filter array in the data receiving portion comprises an array of bandpass filters and an array of switches for selectively enabling the filters.

3. The optical data transmission system of claim 2 wherein the array of switches is an array of MEM switches.

4. The optical data transmission system of claim 1 wherein the light generated by the majority but less than all of the lasers in at least one segment is modulated by modulating the majority but less than all of the lasers in the array of lasers.

5. The optical data transmission system of claim 1 wherein the lasers in at least one segment are laser diodes.

6. The optical data transmission system of claim 1 wherein each segment of the data transmission portion also includes d)

a segment multiplexer for combining outputs of the modulated lasers and the frequency shifted unmodulated reference signal in each segment.

7. The optical data transmission system of claim 6 wherein an output of each segment multiplexer is applied to a first wavelength multiplexer and wherein the frequency shifted unmodulated optical reference tone of each segment and the optical comb generated by the optical comb generator are applied to a second wavelength multiplexer.

8. The optical data transmission system of claim 1 wherein the at least two demultiplexers separate the demultiplex signals into the plurality of segments.

9. An optical data transmitter comprising:
  (a) an optical comb generator for generating a comb of discrete optical tones;
  (b) at least one transmitter segment, said at least one transmitter segment and any additional transmitter segments including at least:
    (i) an array of lasers, with each laser in the array of lasers in each segment being injection locked to an optical tone in the comb generated by the optical comb generator;
    (ii) a data source providing data for modulating the light generated by a majority but less than all of the lasers in the array of lasers in each segment;
    (iii) a frequency shifter for frequency shifting at least one laser in the array of lasers in each segment, the frequency shifter shifting cooperating with the at least one laser in the array of lasers in each segment to generate a frequency-shifted unmodulated reference signal which occurs in the frequency domain between the discrete optical tones generated by the optical comb generator;
  (c) a first multiplexers for combining outputs of the modulated lasers onto a first optical path; and
  (d) a second multiplexer for combining frequency-shifted unmodulated reference signals onto a second optical path.

10. The optical data transmitter of claim 9 wherein the light generated by the majority but less than all of the lasers in at least one segment is modulated by modulating the majority but less than all of the lasers in the array of lasers.

11. The optical data transmitter of claim 9 wherein the lasers in said at least one transmitter segment are laser diodes.

12. The optical data transmitter of claim 9 wherein said at least one transmitter segment and any additional transmitter segments also include iv) a segment multiplexer for combining outputs of the modulated lasers and the frequency shifted unmodulated reference signal in each segment.

13. The optical data transmitter of claim 12 wherein an output of each segment multiplexer is applied to a first wavelength multiplexer and wherein the frequency shifted unmodulated optical reference tone of each segment and the optical comb generated by the optical comb generator are applied to a second wavelength multiplexer.

14. The data transmitter of claim 12 wherein an output of each segment multiplexer is applied to a first wavelength multiplexer and wherein the frequency shifted unmodulated optical reference tone of each segment and the optical comb generated by the optical comb generator are applied to a second wavelength multiplexer.

15. An optical data receiver comprising:
  a first demultiplexer for demultiplexing modulated signals on at least a first optical path;
  a second demultiplexer for demultiplexing unmodulated signals on at least a second optical path; and
  at least one receiver segment, said at least one receiver segment and any additional receiver segments including at least:
    a photodetector for detecting demultiplexed modulated signals on the at least first optical path;
    a photodetector for detecting demultiplexed unmodulated signals on the at least second optical path;
    a filter array associated with each photodetector in each segment, the filter array selecting a desired modulated tone on the at least first optical path and an associated desired unmodulated tone on the at least second optical path, the associated desired unmodulated tone being between discrete optical tones generated by an optical comb generator; and
    a mixer for detecting the filtered demultiplexed modulated signals and the filtered demultiplexed unmodulated signals to recover at least a portion of data provided by a data source.

16. The optical data receiver of claim 15 wherein the filter array in the data receiving portion comprises an array of bandpass filters and an array of switches for selectively enabling the filters.

17. The optical data receiver of claim 16 wherein the array of switches is an array of MEM switches.

18. The optical data receiver of claim 15 wherein the first demultiplexer and the second demultiplexer separate the modulated and unmodulated signals into the at least one receiver segments and any additional receiver segments.

19. A method of optically modulating and transmitting source data comprising:
  (a) generating an optical comb using an optical comb generator, the optical comb comprising optical tones having a frequency spacing equal to $\Delta f$;
  (b) modulating selected ones of the optical tones in the optical comb according to the source data to produce a comb of modulated optical tones;
  (c) frequency shifting at least one optical tone in the optical comb by a frequency less than $\Delta f$ to produce a frequency shifted unmodulated optical reference tone;
  (d) multiplexing the modulated optical tones onto a first optical path; and
  (e) multiplexing the frequency shifted unmodulated optical reference tones onto a second optical path.

20. The method of claim 19 wherein the optical tones are divided into segments of optical tones, each segment of optical tones having a frequency shifted unmodulated optical reference tone and a plurality of modulated tones, the tones of each segment being multiplexed by a segment multiplexer associated with each segment.

21. The method of claim 20 wherein an output of each segment multiplexer is applied to a first wavelength multiplexer and wherein the frequency shifted unmodulated optical reference tones of each segment and the optical comb generated by the optical comb generator are applied to a second wavelength multiplexer.

22. The method of claim 19 wherein modulating selected ones of the optical tones in the optical comb is accomplished by modulating an output of each laser in a set of lasers which are optically injection-locked to different optical tones in the optical comb.

23. The method of claim 22 wherein the output of each laser in a set of lasers is modulated by direct intensity modulation of each laser.

24. A method of receiving and demodulating source data, which has been optically modulated and transmitted according to the method of claim 19, the method of receiving comprising:

(a) optically demultiplexing the multiplexed optical comb, the frequency shifted unmodulated optical reference tone in at least one demultiplexer;

(b) photodetecting in a first photodetector modulated tones provided via the at least one demultiplexer;

(c) photodetecting in a second photodetector unmodulated tones provided via the at least one demultiplexer; and (d) filtering and mixing outputs of the first and second photodetectors.

25. The method of claim 24 wherein the optical tones are generated by an optical comb generator and are divided into segments of optical tones, each segment of optical tones having a frequency shifted unmodulated optical reference tone and a plurality of modulated tones, the tones of each segment being multiplexed by a segment multiplexer associated with each segment and, when demultiplexed in accordance with the aforementioned optically demultiplexing, being separated again into segments.

26. A data transmitter comprising:

(a) an optical comb generator for generating a comb of discrete optical tones having a frequency spacing equal to $\Delta f$;

(b) at least one transmitter segment, said at least one transmitter segment and any additional transmitter segments including at least:

(i) an array of lasers, with each laser in the array of lasers in said at least one segment being injection locked to an optical tone in the comb generated by the optical comb generator;

(ii) a data source providing data for modulating the light generated by at least a majority but less than all of the lasers in the array of lasers in each segment; and (iii) a frequency shifter for frequency shifting at least one laser in the array of lasers in each segment, the frequency shifter cooperating with the at least one laser in the array of lasers in said at least one segment to generate a frequency-shifted unmodulated reference signal which is shifted by a value greater than 0 hertz and less than $\Delta f$.

27. The data transmitter of claim 26 wherein the light generated by the majority but less than all of the lasers in at least one segment is modulated by modulating the majority but less than all of the lasers in the array of lasers.

28. The optical data transmitter of claim 26 wherein the lasers in said at least one segment are laser diodes.

29. The data transmitter of claim 26 wherein said at least one transmitter segment and any additional transmitter segments also include iv) a segment multiplexer for combining outputs of the modulated lasers and the frequency shifted unmodulated reference signal in each segment.

* * * * *